(12) United States Patent
Sullivan et al.

(10) Patent No.: US 11,699,034 B2
(45) Date of Patent: Jul. 11, 2023

(54) HYBRID ARTIFICIAL INTELLIGENCE SYSTEM FOR SEMI-AUTOMATIC PATENT INFRINGEMENT ANALYSIS

(71) Applicant: DAYSTROM INFORMATION SYSTEMS, LLC, San Jose, CA (US)

(72) Inventors: Stephen G. Sullivan, Mountain View, CA (US); Arnold E. Brown, II, San Jose, CA (US)

(73) Assignee: Daystrom Information Systems, LLC, San Jose, CA (US)

( * ) Notice: Subject to any disclaimer, the term of this patent is extended or adjusted under 35 U.S.C. 154(b) by 325 days.

(21) Appl. No.: 16/998,825

(22) Filed: Aug. 20, 2020

(65) Prior Publication Data

US 2021/0056261 A1    Feb. 25, 2021

Related U.S. Application Data

(60) Provisional application No. 62/889,156, filed on Aug. 20, 2019.

(51) Int. Cl.
  *G06F 40/20*    (2020.01)
  *G06F 16/93*    (2019.01)
  *G06N 20/00*    (2019.01)

(52) U.S. Cl.
  CPC .............. *G06F 40/20* (2020.01); *G06F 16/93* (2019.01); *G06N 20/00* (2019.01)

(58) Field of Classification Search
  CPC .......... G06F 40/20; G06F 16/93; G06F 40/30; G06N 20/00; G06N 3/0427; G06N 3/08; G06Q 50/184

USPC .............................................. 704/9
  See application file for complete search history.

(56) References Cited

U.S. PATENT DOCUMENTS

| | | | |
|---|---|---|---|
| 11,158,012 B1* | 10/2021 | Rajpara | G06Q 50/18 |
| 2007/0220041 A1* | 9/2007 | Van Luchene | G06Q 10/06 |
| | | | 707/999.102 |
| 2009/0063427 A1* | 3/2009 | Zuta | G06F 40/247 |
| 2009/0228777 A1* | 9/2009 | Henry | G06F 16/40 |
| | | | 707/999.005 |
| 2011/0047166 A1* | 2/2011 | Stading | G06F 16/332 |
| | | | 707/E17.109 |
| 2011/0191310 A1* | 8/2011 | Liao | G06F 16/313 |
| | | | 707/723 |

(Continued)

*Primary Examiner* — Akwasi M Sarpong
(74) *Attorney, Agent, or Firm* — Stephen G. Sullivan (57) ABSTRACT

Disclosed embodiments perform patent claims analysis using preconditioning rules to determine relevant portions of a reference document. A query is submitted to find a set of patents that are similar to the reference document. A set of matching patents from the query are received and claim construction rules are used to determine how a meaning of claim elements of the patents will be ascertained in further analysis. Patent infringement rules and an artificial intelligence (AI) system are used to search the relevant portions of the reference document with the claim constructed claim elements of the patents returned from the search. The set of patents are ranked based on assigned confidence scores indicating a degree to which respective claim elements match the relevant portions of the reference document, and the results are presented to a client device. The system may a machine learning model and a natural language understanding (NLU) system.

18 Claims, 6 Drawing Sheets

(56) References Cited

U.S. PATENT DOCUMENTS

| | | | | |
|---|---|---|---|---|
| 2014/0289675 A1* | 9/2014 | Stading | ............... | G06F 16/3331 |
| | | | | 715/810 |
| 2015/0046363 A1* | 2/2015 | McNamara | ........ | G06Q 10/0833 |
| | | | | 705/333 |
| 2015/0339020 A1* | 11/2015 | D'Amore | .............. | G06F 3/0484 |
| | | | | 715/753 |
| 2016/0004768 A1* | 1/2016 | Barney | ................. | G06F 16/334 |
| | | | | 707/749 |
| 2016/0048936 A1* | 2/2016 | Perkowski | ........... | G06Q 10/063 |
| | | | | 705/310 |
| 2016/0350886 A1* | 12/2016 | Jessen | .................. | G06Q 50/184 |
| 2018/0285996 A1* | 10/2018 | Ma | ........................ | H04L 9/3297 |
| 2019/0073722 A1* | 3/2019 | Obradovic | ............. | G06Q 50/01 |
| 2019/0079979 A1* | 3/2019 | Chan | ....................... | G06Q 50/18 |
| 2019/0213407 A1* | 7/2019 | Toivanen | ................. | G06F 40/30 |
| 2019/0391976 A1* | 12/2019 | Tsai | .................... | G06F 16/2465 |

* cited by examiner

HYBRID ARTIFICIAL INTELLIGENCE SYSTEM FOR SEMI-AUTOMATIC PATENT INFRINGEMENT ANALYSIS

CROSS-REFERENCE TO RELATED APPLICATIONS

This application claims the benefit of provisional Patent Application Ser. No. 62/889,156, filed Aug. 20, 2019, assigned to the assignee of the present application, and incorporated herein by reference.

BACKGROUND

Keyword searches simply find exact matches or synonym matches based on the terms or phrases in a query. Semantic searches use a semantic model learned from some domain to find semantic matches based on meaning to not only find keywords, but to determine the intent and contextual meaning of the words a person is using for search. This means that a search query may find some matches to documents that do not share any keywords from the search query but are nevertheless relevant.

Natural Language Processing, usually shortened as NLP, is a branch of artificial intelligence that deals with the interaction between computers and humans using the natural language. The ultimate objective of NLP is to read, decipher, understand, and make sense of the human languages in a manner that is valuable. Most NLP techniques rely on machine learning to derive meaning from human languages. NPL utilizes both syntactic analysis and semantic analysis. In NLP, syntactic analysis is used to assess how the natural language aligns with the grammatical rules. Semantics refers to the meaning that is conveyed by a text. Semantic analysis is one of the difficult aspects of Natural Language Processing that has not been fully resolved yet. It involves applying computer algorithms to understand the meaning and interpretation of words and how sentences are structured.

Most cognitive computing technologies described above cannot natively do the thing that makes them effective in this task: comprehend text. The only way to get past the comprehension limitation is to teach the machine. To do so requires the manual tagging of tens of thousands of documents. And that's just to have a baseline of knowledge. To improve results requires even more documents and much longer training and tuning processes. This is on top of the frustration that comes with managing a "black box," which is something that coders/user do not how it works. Although machine learning has been portrayed as cognitive and automatic, does not in reality "understand" or "learn" in autonomy. Machine learning only approximates understanding and requires a lot of time and effort to go in production.

Using a computer to understand the meaning of text is exceedingly difficult. It is even more so in the realm of patents. For years, courts have explained that a patent application is one of the most difficult legal instruments that can be drafted. For example, in 1988, the United States Supreme Court reiterated this assertion in Laitram Corp. v. Cambridge Wire Cloth Co. (863 F.2d 855): "[t]his appeal again illustrates one of the many difficult dichotomies that lurk in the lacunae of patent law. On one side rests the very important, statutorily-created necessity of employing the clearest possible wording in preparing the specification and claims of a patent, one of 'the most difficult legal instruments to draw with accuracy.' On the other lies the equally important, judicially-created necessity of determining infringement without the risk of injustice that may result from a blindered focus on words alone."

For understanding the meaning of patents and patent claims, machine learning technology is still insufficiently accurate to be viable solution due to the variability of each document and there is no guarantee that even massive amounts of "training" would result in correct results.

Accordingly, a new method of using AI is needed to perform patent searching.

BRIEF SUMMARY

The disclosed embodiments provide methods and systems for performing patent claims analysis. Aspects of the disclosed embodiments include using preconditioning rules to determine relevant portions of a reference document. A query is submitted to find a set of patents that are similar to the reference document. A set of matching patents from the query are received and claim construction rules are used to determine how a meaning of claim elements of the patents will be ascertained in further analysis. Patent infringement rules and an artificial intelligence (AI) system are used to search the relevant portions of the reference document with the claim constructed claim elements of the patents returned from the search. The set of patents are ranked based on assigned confidence scores indicating a degree to which respective claim elements match the relevant portions of the reference document, and the results are presented to a client device. In one embodiment, the AI system may utilize machine learning (ML) models and natural language understanding (NLU) systems.

In another embodiment, a system comprises a hybrid artificial intelligence (AI) system in communication with a patent search provider and a client device over a network. The hybrid AI system is configured to receive a search request from the client device to find patents that read on a text description provided in a reference document; perform a patent search on the reference document to find a set of patents that are similar to the reference document; and determine relevant portions of the reference document to narrow a focus of subsequent analysis. The system further includes an AI system in communication with the hybrid AI system. The AI system is configured to input text of the reference document to determine the meanings of words in the reference document; input text of at least a portion of the patents returned from the patent search to determine meanings of the claim elements based on the meanings of words in corresponding patent; for each of the patents, perform an element-by-element search to find matches between the claim elements and the relevant portions of the reference document based on the meanings of words; and output to the client device a list of the patents having claims elements that match the text of the relevant portions of the reference document along with element confidence scores or claim confidence scores.

According to the methods and systems disclosed herein, the disclosed embodiments provide an improved patent searching system that uses a combination of expert system rules, machine learning (ML) models and natural language understanding (NLU) systems to perform semi-automated patent claims analysis. Such analysis may be used to aid a patent expert's decision-making ability, preferably through a workflow. Accordingly, the system of the disclosed embodiments improves the speed and accuracy of a computer or server when performing a patent search, particularly for infringement analysis.

DETAILED DESCRIPTION

The exemplary embodiment relates to a hybrid artificial intelligence system for semi-automatic patent claims analysis. The following description is presented to enable one of ordinary skill in the art to make and use the invention and is provided in the context of a patent application and its requirements. Various modifications to the exemplary embodiments and the generic principles and features described herein will be readily apparent. The exemplary embodiments are mainly described in terms of particular methods and systems provided in particular implementations. However, the methods and systems will operate effectively in other implementations. Phrases such as "exemplary embodiment", "one embodiment" and "another embodiment" may refer to the same or different embodiments. The embodiments will be described with respect to systems and/or devices having certain components. However, the systems and/or devices may include more or less components than those shown, and variations in the arrangement and type of the components may be made without departing from the scope of the invention. The exemplary embodiments will also be described in the context of particular methods having certain steps. However, the method and system operate effectively for other methods having different and/or additional steps and steps in different orders that are not inconsistent with the exemplary embodiments. Thus, the present invention is not intended to be limited to the embodiments shown but is to be accorded the widest scope consistent with the principles and features described herein.

Figure 1:
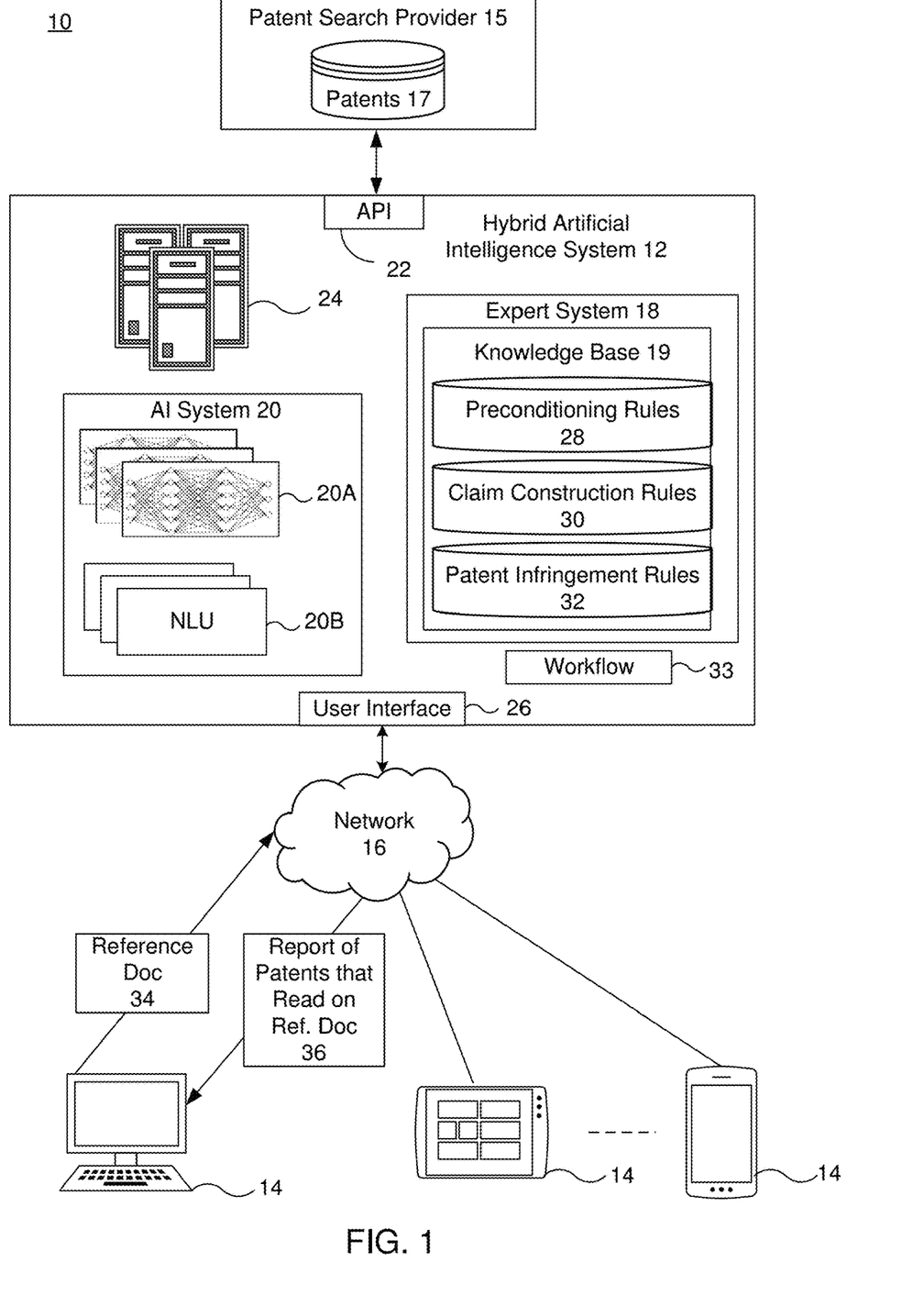
FIG. 1 is a diagram illustrating a hybrid artificial intelligence system for semi-automatic patent claims analysis.

FIG. 1 is a diagram illustrating a hybrid artificial intelligence system for semi-automatic patent claims analysis. In one embodiment, the system 10 comprises the hybrid AI system 12 in communication with a patent search provider 12 and a plurality of client devices 14 over a public or private network 16. The hybrid AI system 12 further includes one or more servers 24 that hosts the hybrid AI system 12, an expert system 18, an artificial intelligence (AI) system 20, and a user interface (UI) 26 that is displayed on the client devices 14. The hybrid AI system 12 may communicate with a patent search provider 15 through an application programming interface (API) 22, which may be provided by the patent search provider 15 or the hybrid AI system 12. In another embodiment, patent search provider 15 may be integrated tin the hybrid AI system 12.

The hybrid AI system 12 receives search requests from the client devices 14 to find patents 17 that read on a text description provided in a reference document 34. In one embodiment, the hybrid AI system 12 is implemented as a platform as a service (PaaS) or a cloud computing model in which the expert system 18 is integrated as a front-end to the AI system 20. The expert system 18 emulates the knowledge of a patent attorney using a knowledge base 19 of intellectual property (IP) law rules. In one embodiment, the knowledge base 19 comprises one or more of preconditioning rules 28, a set of claim construction rules 30, and a set of patent infringement rules 32, as explained further below.

In one embodiment, the AI system 20 may include one or more machine learning (ML) models 20A and one or more natural language understanding (NLU) systems 20B. The ML models 20A may comprise artificial neural networks (ANNs), or simply neural networks, for modelling data using a collection of nodes or artificial neurons connected by edges. The nodes and the edges typically have a weight that adjusts as learning proceeds. The weight increases or decreases the strength of the signal at a connection. Typically, nodes are aggregated into layers and different layers may perform different transformations on input signals travelling from the first layer, called the input layer, to the last layer, called the output layer, typically after traversing multiple layers.

Machine learning algorithms build a mathematical model based on sample data, known as "training data", and can then process additional data to make predictions or to make or decisions without being explicitly programmed with task-specific rules. In this case, the ML models 20A are trained using large sets of patents 17 (i.e., issued patents and patent publications) and optionally technical documents categorized into domains. Domains may refer to specific technology groupings based on common subject matter, such as semiconductors, a network communication protocol, display devices, cancer treatments, software security, and the like. In one embodiment, a ML model 20A may be created for each patent domain.

Both the ML models 20A and the NLU system 20B are used to process text-based reference documents 34 and patents 17, and as such may make use of language models that use continuous representations or embeddings of words or phrases, where words or phrases are represented as vectors in a predefined vector space. In one embodiment, language models capable of capturing contextual representations in the text may be used (e.g., to distinguish Jaguar the animal from Jaguar the automobile). Example language models may include topic models (e.g., Latent Dirichlet Allocation) and Bidirectional Encoder Representations from Transformers (BERT). In one embodiment, language models capable of learning hierarchical text representations may be used. Poincare embeddings that compute word embeddings in hyperbolic space, rather than in Euclidean space, may be used for such purposes. An example use of a hierarchical representation is the ability to recognize that a screw and a nail are both a subset of fasteners, for instance.

The NLU system 20B is a subtopic of Natural language processing (NLP), but focuses primarily on machine reading comprehension. Like NLP, NLU uses algorithms to reduce human language into a structured ontology or knowledge graph—a collection of concepts between which relations are specified (typically as a network) and that together expresses knowledge. Syntactic analysis performed by the NLU system 20B also applies grammatical rules to groups of words in a text to derive meaning using techniques including lemmatization, stemming, morphological segmentation, word segmentation, parsing, part of speech tagging, sentence breaking and word sense disambiguation. As used herein, the phrase, an NLU system 20B is intended to include NLP techniques.

According to one aspect of the disclosed embodiments, the expert system 18 operates interactively with the AI system 20 to perform semi-automated patent claims analysis to aid a patent expert's decision-making ability, preferably through a workflow 33 and/or a series of reports displayed through the UI 26.

In operation, a reference document 34 is submitted to the hybrid AI system 12 from one of the client devices 14 to use as input for a patent search. The reference document 34 may include a description of a system, device, process or composition of matter, and the purpose of the hybrid AI system 12 is to determine whether that system, device, process or composition of matter is either taught by prior patents (i.e., a prior art or patentability search), or infringes the claims of one or more U.S. or foreign patents (i.e., an infringement search). The expert system 18 may first apply preconditioning rules 28 to the reference document 34 to narrow the focus of subsequent analysis. The conditioned reference document is submitted to the patent search provider 15 to find a set of patents that are semantically similar to the reference document 34 as determined by a conventional semantic and/or keyword search. The patent infringement rules 32 are then applied to the set of patents to find the patents having claims that "read on" the description set forth in the reference document 34. A report 36 is then presented to the requesting client device 14 through the user interface 26 of the hybrid AI system 12 listing the patents and/or the claims found to read on the reference document 43. When a patent "reads on" a reference, the system, device, process or composition of matter described in reference document can be said to infringe the claims of the patent.

In one embodiment, the expert system 18, the AI system 20, the API 22, and the user interface 26 are implemented as software components. In another embodiment, these components could be implemented as a combination of hardware and software. Although the expert system 18, the AI system 20, the API 22, and the user interface 26 are shown as separate components, the functionality of each may be combined into a lesser or greater number of modules/components. In addition, although a server 24 is shown hosting the hybrid AI system 12, the hybrid AI system 12 may be run on any type of one more computers that have memory and processor.

Both the server 24 and the client devices 14 may include hardware components of typical computing devices (not shown), including a processor, input devices (e.g., keyboard, pointing device, microphone for voice commands, buttons, touchscreen, etc.), and output devices (e.g., a display device, speakers, and the like). The server 24 and client devices 14 may include computer-readable media, e.g., memory and storage devices (e.g., flash memory, hard drive, optical disk drive, magnetic disk drive, and the like) containing computer instructions that implement the functionality disclosed when executed by the processor. The server 24 and the client devices 14 may further include wired or wireless network communication interfaces for communication over the network 16. Example types of client devices 14 include PC's, notebooks, tablets, mobile phones and wearable devices such as smart watches.

Although the server 24 is shown as a single computer, the functions of server 24 may be distributed over more than one server, and the functionality of software components may be implemented using a different number of software components. For example, the expert system 18 may be implemented as more than one component. In an alternative embodiment (not shown) the expert system 18, the AI system 20, and/or the UI 26 may be implemented as a standalone application that runs on the client devices 14. For example, the hybrid AI system 12 may be implemented as an iOS app that includes Core ML to implement the AI system 20.

Figure 2A:
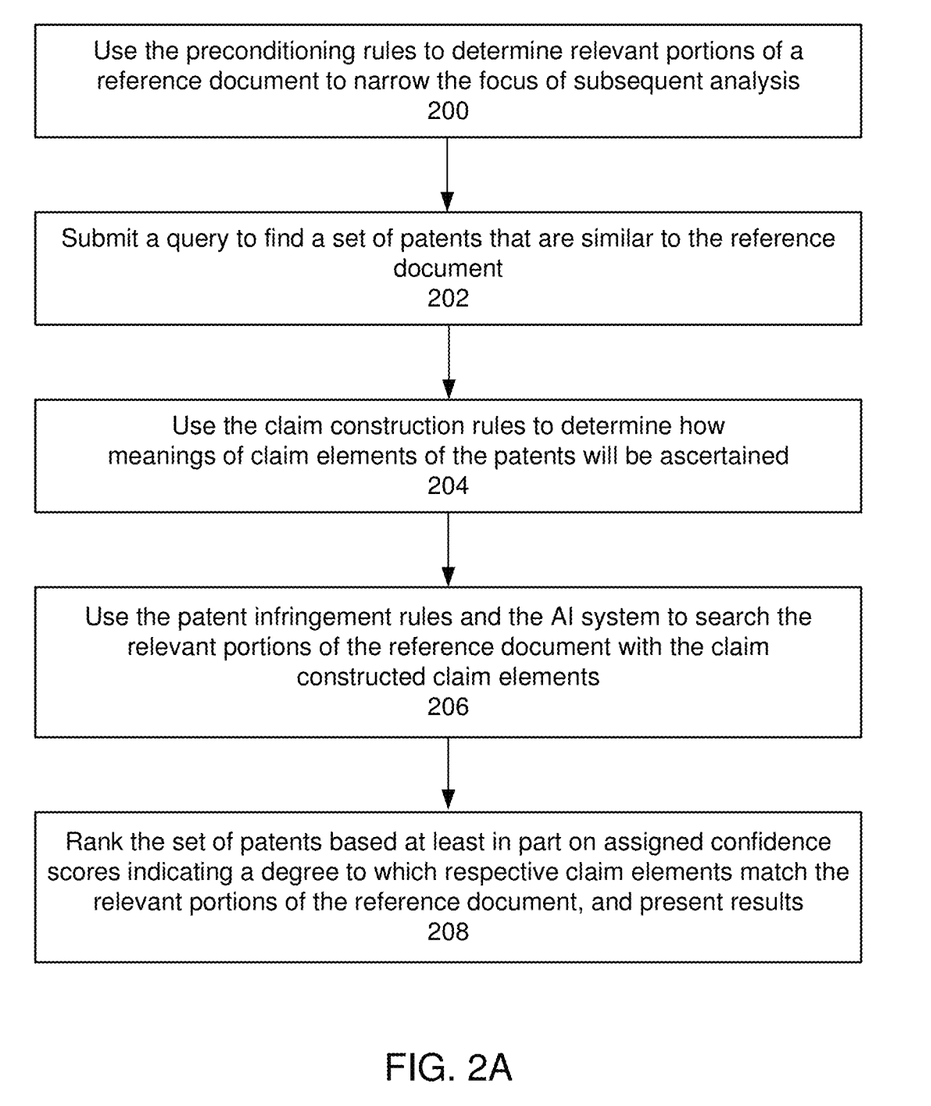
FIG. 2A illustrates a flow diagram of a process for semi-automatic patent claims analysis according to one embodiment.

FIG. 2A illustrates a flow diagram of a process for semi-automatic patent claims analysis according to one embodiment. The process may begin after the hybrid AI system 12 receives a search request from a client device 14 and a user selection of the reference document 34. The hybrid AI system 12 then uses the preconditioning rules 28 to determine relevant portions of the reference document 34 to narrow the focus of subsequent analysis (block 200). In one embodiment, the preconditioning process may include determining which portions of the reference document 34 are relevant to the user's search, and which can be ignored. For example, the preconditioning rules 28 may be used to exclude figures and tables from the reference document. In one embodiment, the process may also include resolving the meanings of any acronyms found in the reference document 34 based on the reference document 34 itself or by querying third-party sources. In a further embodiment, the process may include receiving from the user annotations for the reference document 34 that provide further definitions or otherwise indicate text that is weighted higher during searching. In one embodiment, the preconditioning process may constitute a first level of analysis.

The hybrid AI system 12 submits a query to find a set of patents that are similar to the reference document (block 202). In one embodiment the query is submitted to the search provider 15. However, in another embodiment, the functions of the patent search provider 15 may be incorporated into the hybrid AI system 12 in which case the hybrid AI system 12 performs patent search. In one embodiment, the search provider 15 performs a conventional keyword or semantic search. In one embodiment, only the matching patents having a rank or confidence score above a predefined threshold (e.g., greater than 50%) may be selected for further analysis. This initial patent search may constitute a second level of analysis.

The hybrid AI system 12 receives a set of matching patents from the query and performs claim construction on claims of the patents using the claim construction rules 30 to determine how the meaning of claim elements of the patents will be ascertained (block 204). According to one aspect of the disclosed embodiments, the claim construction rules 30 may be based on legal statues/codes/case law of different countries that may be selectable by the user. For example, the user may have the option to select U.S. statutes and case law or statutes and case law from other countries. The hybrid AI system 12 may also enable user to select from different case law holdings, e.g., whether the preamble should or should not be analyzed during claim construction. The claim construction rules 30 may be stored in the knowledge base 19 or other type of database or table. In embodiments, the claim construction rules 30 may be stored as settings that may have default values. In another embodiment, the default values may be hardcoded into the software the hybrid AI system. For example, the claim construction rules 30 may default to US patent law, and may analyze the patents "as is," i.e., without additional claim construction rules. If the defaults are unchanged, no user input is necessary. The claim construction process may constitute a third level of analysis.

After claim construction, the hybrid AI system 12 performs infringement analysis using the patent infringement rules 32 and the AI system 20 to search the relevant portions of the reference document with the claim constructed claim elements of the patents returned from the search (block 206). According to one aspect of the disclosed embodiments, the patent infringement rules 32 are also based on legal statues/codes/case law. According to the disclosed embodiments, the patent infringement rules 32 may be based on legal statues/codes/case law that may be selectable by the user. For example, the user may have the option to select U.S. statutes and case law or from other countries. The hybrid AI system 12 may also enable the user to select from different case law holdings or doctrines, e.g., whether to apply or not to apply the doctrine of equivalents during the patent infringement analysis. The patent infringement rules 32 may be stored in the knowledge base 19 or other type of database or table. The infringement analysis may constitute the fourth level of analysis.

The hybrid AI system 12 may then rank the set of patents based on assigned confidence scores indicating a degree to which respective claim elements match the relevant portions of the reference document, and presents the results to the request client device 14 (block 208). In one embodiment, the results may be presented in the workflow 33 or other report listing the set of patents with claim element confidence scores, claim confidence scores, and/or overall patent confidence scores. In one embodiment, the confidence scores may be generated by the AI system 20, the hybrid AI system 12, or a combination of both. In an embodiment, the results may also include an indication where the claim elements match text in the reference document, e.g., by highlighting the claim elements in one window and highlighting matching the text in another window. In the embodiment where the results are displayed in the workflow 33, hybrid AI system 12 may allow a user, e.g., attorneys or patent experts, to tag (correct) the report, and input the tagged report to the AI system 20 for further training of the AI system 20 so that the hybrid AI system 12 learns over time.

Figure 2B:
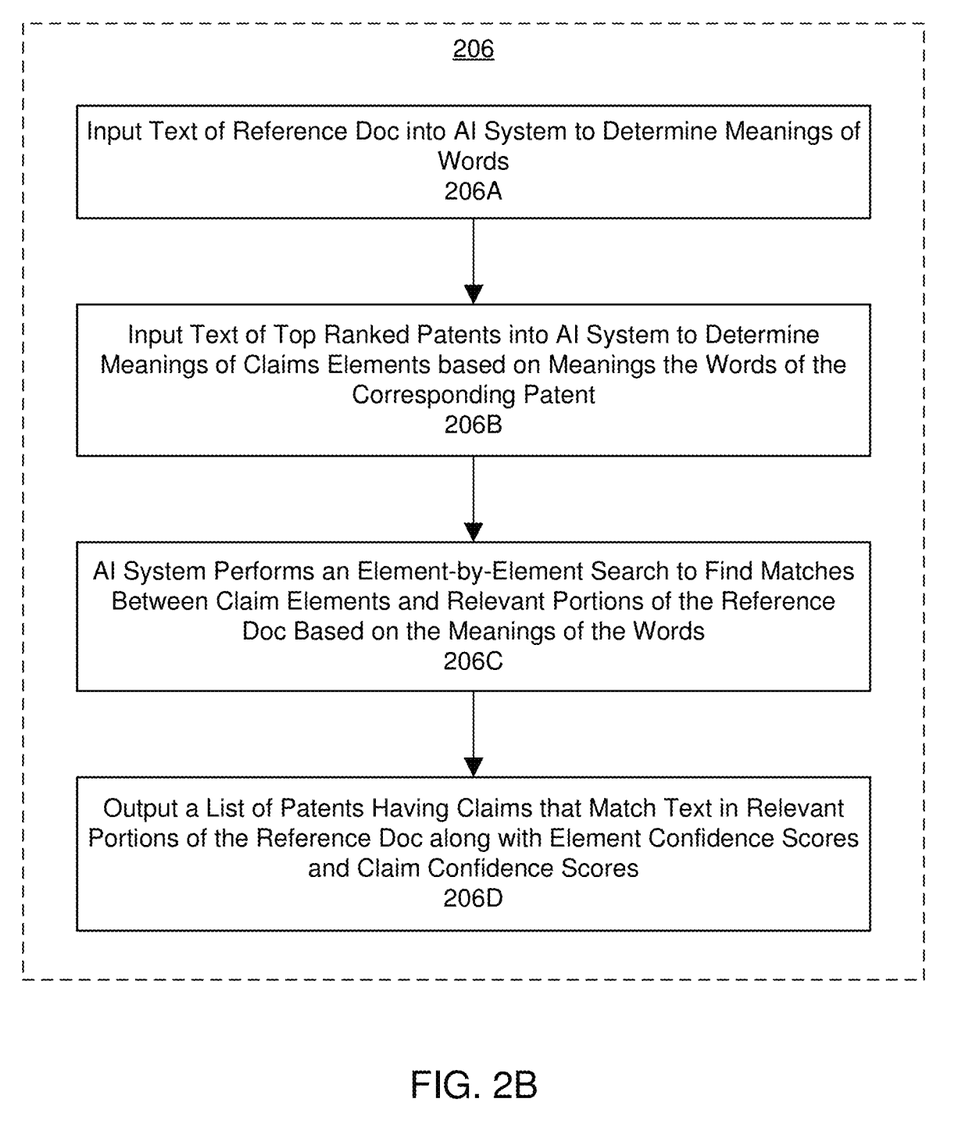
FIG. 2B illustrates a flow diagram showing further details of the processing of block 206 of FIG. 2A when searching the relevant portions of the reference document with claim elements according to one embodiment.

FIG. 2B illustrates a flow diagram showing further details of the processing of block 206 of FIG. 2A when searching the relevant portions of the reference document with the claim elements according to one embodiment. The search process may include inputting text of the reference document 34 into the AI system 20 to determine the meanings of the words in the reference document 34 (block 206A). Note that the entire reference document 34 is used in the step rather than just the relevant portions for better contextual understanding. In one embodiment, the text of the reference document 34, an identification of the relevant portions, and any user annotations are input to the AI system 20.

The text of the top ranked patents returned from the patent search are also input to the AI system 20 to determine the meanings of the claim elements based on the meanings of the corresponding patent (block 206B). In one embodiment, the hybrid AI system 12 may parse each of the patents to extract the specification and to extract claims therein, and passes those to the AI system 20 with the corresponding patent identifier (e.g., a patent number). In another embodiment, the AI system 20 may perform the parsing.

In one embodiment, claim elements of each of the claims may be extracted as a sentence-like phrase that ends with a colon or semi-colon. In another embodiment, the claim elements may be extracted as nouns, as adjective and noun phrases, or as adjective, noun and verb phrases in the claim. Blocks 206A and block 206B as described above are order independent.

According to one aspect of the disclosed embodiments, the AI system 20 performs for each of the patents an element-by-element search to find matches between the claim elements and the relevant portions of the reference document based on meanings of words in both the texts (block 206C). In one embodiment, the AI system 20 uses the ML model 20A, the NLU system 20B or both, to perform for each of the patents an element-by-element search. The claim elements may be matched to text of the reference document at various levels, such as at word-level, phrase-level, sentence-level, paragraph-level, or section/chapter-level). The patent infringement rules are used to guide the search performed by the AI system 20 to determine, for example, whether the preamble of the claims is considered a claim element that is searched for in the relevant portions of the reference document.

The AI system 20 then outputs a list of patents having claims elements that match the text of the relevant portions of the reference document along with element confidence scores and claim confidence scores (206D). The element confidence scores and the claim confidence scores are based on a degree of similarity. The claim confidence scores may be a sum, average or other function of the element confidence scores within a claim. For example, the claim confidence score may be based on the highest element score from in the corresponding claim, or the claim confidence score may be based on average of the element scores. A patent confidence score may also be generated as a function of individual claim confidence scores within a patent.

In embodiments, the text of the reference document and the text of the patents are input to the ML model 20A and the NLU system 20B in parallel for an ensemble approach where the claim element confidence scores and patent confidence scores output by each are combined to form final claim element confidence scores and final patent confidence scores for each patent. In another embodiment, the text of the reference document and the text of the patent are input to the ML model 20A and the NLU system 20B serially, where the output of one is used as input to the other. In one embodiment, the AI system 20 may make use of multiple the ML models 20A and multiple NLU systems 20B.

In one embodiment, the AI system 20 is integrated with the hybrid AI system 12, as shown in FIG. 1. However, in another embodiment, the ML model 20A or the NLU system 20B of the AI system 20 may be provided by a third-party service and called, for example, through a Representational state transfer (REST) application programming interface (API).

Figure 3:
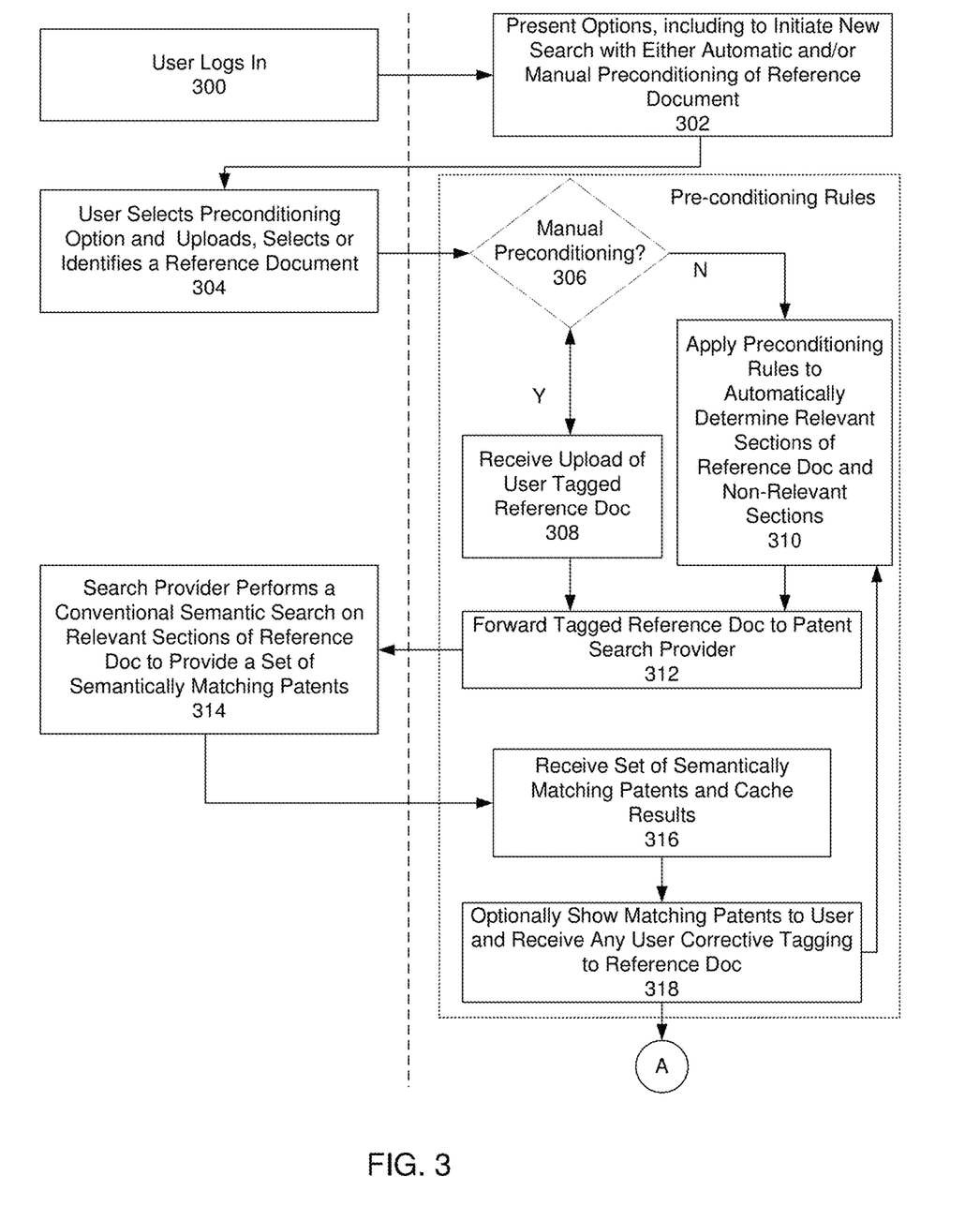
FIG. 3 is a flow diagram illustrating the process performed by the hybrid AI system in further detail to achieve an element-by-element claim analysis according to one embodiment.

FIG. 3 is a diagram illustrating the process performed by the hybrid AI system 12 in further detail to achieve an element-by-element claim analysis. The process may begin when the user logs in (block 300), and the hybrid AI system 12 presents options including the initiating a search with either automatic and/or manual preconditioning of the reference document (block 302). The user selects one or both of the preconditioning options, and uploads, selects or identifies a reference document (block 304). With manual preconditioning, the user may select relevant portions of the reference document and/or tag the reference document with annotations.

The hybrid AI system 12 determines whether the preconditioning has been selected (block 306). If so, the system 12 receives the upload of the user tagged reference document (block 308). If not, the system 12 tags the reference document by automatically applying the preconditioning rules 28 and optionally a machine learning component to automatically determine relevant sections of the reference document and non-relevant sections (block 310). The system 12 forwards the tagged reference document to the patent search provider 15 (block 312). The search provider 15 performs a traditional semantic search on the relevant sections of the reference document and provides a set of semantically matching patents (block 214).

The hybrid AI system 12 receives the set of semantically matching patents with match scores and caches the results for future searches and faster responses (block 316). The hybrid AI system 12 optionally shows the set of matching patents to the user and optionally receives any user corrective tagging to the reference document in response (block 318). The hybrid AI system 12 then applies claim construction rules 30 according to current legal claim construction laws to the claims of the patents having a match score above a predetermined threshold (block 320). The claim constructed claims may be optionally cached for future searches and faster responses (block 322).

The hybrid AI system 12 queries the AI system 20 with the relevant sections of the reference document 34 and the claim constructed claims (block 324). The AI system 20 then finds claim elements from the claim constructed claims that read on the relevant sections of the reference document (block 326). The hybrid AI system 12 receives the claim element matches and confidence scores from the AI system 20 (block 328).

Once the hybrid AI system 12 receives the claim element matches and confidence scores from the AI system 20, the hybrid AI system 12 determines the rankings of the matching patents based at least in part on the ratio of the claim elements found in the relevant portions of the reference document and confidence scores (block 330). The system 12 generates and presents the report showing the patent rankings and presents the report with viewing options to the requesting user (block 332). The user reviews the report and selects any viewing options (block 334). Finally, the system 12 receives any user corrective tagging made to the report and inputs the tagged report to the AI system 20 so that the AI system 20 learns over time (block 336).

Figure 4A:
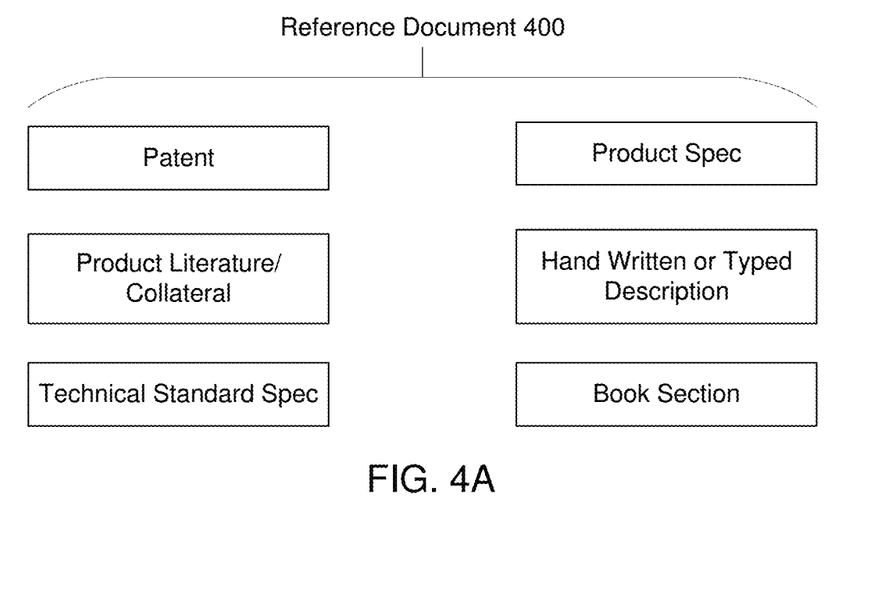
FIG. 4A is a diagram illustrating an example types of reference document that may be input to the system.

FIG. 4A is a diagram illustrating an example types of reference document 400 that may be input to the system 12. In one embodiment, example types of reference documents include, but are not limited to, a patent publication, a product specification, product literature/collateral, a written or typed description, a technical standard specification, or a book section.

Figure 4B:
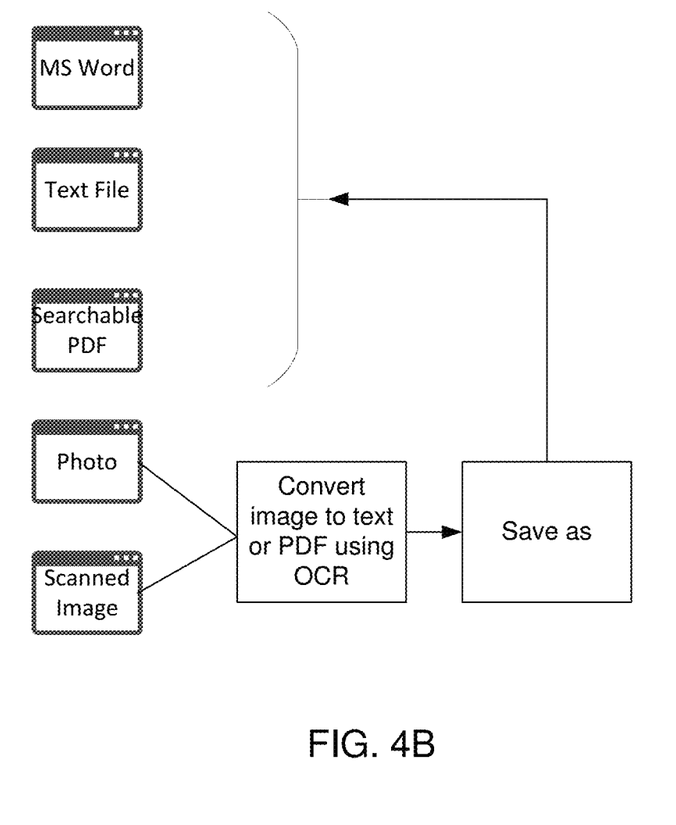
FIG. 4B is a diagram illustrating example file formats of the reference document accepted by the system.

FIG. 4B is a diagram illustrating example file formats of the reference document accepted by the system 12. In one embodiment, examples of acceptable file formats include, but are not limited to, MS Word, text file, searchable PDF, a photo, and a scanned image. In the case where the reference document is text or a scanned image of text, the system 12 may automatically convert the image to text using optical character recognition (OCR) and then store the recognized text in a file in any of the acceptable file formats.

As an example use case, consider the embodiment where the hybrid AI system 12 is implemented as a standalone application executing on a mobile device. The AI system 20 of the hybrid AI system 12 may be local on the mobile device using, for example, CoreML for iOS by Apple Inc®. Consider further that the user is attending the Consumer Electronics Show (CES) and sees a demo of a product that the user suspects infringes one of his patents. Using the application, the user can take a photo of a product flyer for the product through the application. The application performs OCR on the photo and uses the recognized text as the reference document. The application then searches for patents having claims that read on the reference document and informs the user of the results in substantially real time. As another example, the system 12 may be used to identify standards essential patents (SEPs) by inputting a technical standard specification into the system 12 to find patents that read on the technical standard.

The following is a description of legal principles that may be encoded by the claim construction rules 30 and the patent infringement rules 32. The hybrid AI system 12 performs a two-step inquiry. First, the claim construction rules 30 may construe or interpret the meaning of the particular claim terminology. Second, the patent infringement rules 32 may compare the properly construed claim to the reference document to determine whether there is literal infringement or optionally infringement under the doctrine of equivalents.

Claim Construction Rules 30

For each patent in the set of patents, find the claims numbered and located at the end of the patent. For each claim, assign to words in the claim their ordinary and customary meaning, which is the meaning that the term would have to a person of ordinary skill in the art in question at the time of the invention, i.e., as of the effective filing date of the patent application by application of the widely accepted meaning of commonly understood words. Optionally, query public sources that show what a person of skill in the art would have understood disputed claim language to mean. Those sources include the words of the claims themselves, the remainder of the patent specification, the patent prosecution history, and extrinsic evidence concerning relevant scientific principles, the meaning of technical terms, and the state of the art. If the meaning of a word or phrase is still ambiguous, prompt the user for information to aid in determining the correct meaning of the language employed in the patent. Determine if the claim language is drafted in means-plus function form, "means for . . . ," and limit the meaning of means-plus-function phrases in claims to the corresponding structure described in the specification and equivalents thereof.

Patent Infringement Rules 32

Determine a finding of literal infringement when each and every claim element of a particular claim is found in the relevant portions of the reference document. For open-ended claims containing the word "comprising" in the preamble, disregard if the reference document describes elements in addition to the ones specified in the claim. To determine if a means-plus-function limitation is literally infringed, determine if the reference document describes the identical function required by the limitation and incorporates the structure disclosed in the patent specification, or its substantial structural equivalent, as the means for performing that function. Count the ratio of claim elements found in the reference document to calculate claim confidence score, or calculate element confidence scores for each of the claim elements in the claim and then average all the element confidence scores to derive a claim confidence score. Display the matching patents sorted by highest confidence scores.

The Doctrine of Equivalents

If the reference document does not literally infringe a patent claim, determine if the reference document infringes under the doctrine of equivalents by determining whether each claim element has a counterpart in the reference document. If so, determine the relationship between the combination claimed and the components of the reference document, element-by-element. Determine whether the differences between the reference document and the claim elements are insubstantial by: determining whether a missing substitute element in the reference document matches the function, performs the recited function in the same way, and obtains the same result as the claimed element. Determine whether the substitute element plays a role substantially different from the claimed element, and if not, determine there is infringement under the doctrine of equivalents. Otherwise, determine the differences are not insubstantial, and that is there is no infringement under the doctrine of equivalents.

If infringement under the doctrine of equivalents is found, limit the doctrine to (1) not cover an accused device in the prior art, and (2) allow the patentee to recapture through equivalence certain coverage given up during prosecution. Search the prosecution history for an amendment made during prosecution that narrows the scope of a claim to satisfy a requirement of the Patent Act. If found and there is no explanation for the reason for the amendment, use prosecution history estoppel to bar the application of the doctrine of equivalents as to the amended element.

A method and system for a hybrid artificial intelligence system for semi-automatic patent infringement analysis has been disclosed. The present invention has been described in accordance with the embodiments shown, and there could be variations to the embodiments, and any variations would be within the spirit and scope of the present invention. For example, the exemplary embodiment can be implemented using hardware, software, a computer readable medium containing program instructions, or a combination thereof. Accordingly, many modifications may be made by one of ordinary skill in the art without departing from the spirit and scope of the appended claims.

We claim:

1. A computer-implemented method for performing patent claims analysis by software component executing on one or more servers comprising:
    using preconditioning rules to determine relevant portions of a reference document, the preconditioning rules used to: exclude figures and tables from the reference document, and through a user interface, enable a user to resolve meanings of any acronyms found in the reference document or enter annotations for the reference document to provide further definitions or to indicate text weighted higher by the user during searching;
    submitting a query to find a set of patents that are similar to the reference document;
    receiving a set of matching patents from the query and using claim construction rules to determine how a meaning of claim elements of the patents will be ascertained;
    using patent infringement rules and an artificial intelligence (AI) system to search the relevant portions of the reference document with the claim constructed claim elements of the patents returned from the search, wherein the claim construction rules and the patent infringement rules are based on legal statues of one or more countries; and
    ranking the set of patents based on assigned confidence scores indicating a degree to which respective claim elements match the relevant portions of the reference document, and presenting the results to a client device.

2. The method of claim 1, wherein searching the relevant portions of the reference document with the claim constructed claim elements of the patents further comprises:
    inputting text of the reference document into the AI system to determine the meanings of words in the reference document;
    inputting text of at least a portion of the patents returned from the patent search to the AI system to determine meanings of the claim elements based on the meanings of words in the corresponding patent; and
    for each of the patents, performing, by the AI system, an element-by-element search to find matches between the claim elements and the relevant portions of the reference document based on the meanings of words.

3. The method of claim 2, wherein performing the element-by-element search further comprises using, by the AI system, a machine learning (ML model), a natural language understanding (NLU) system, or both, to perform the element-by-element search.

4. The method of claim 3, further comprising inputting the text of the reference document and the text of the patents into the ML model and the NLU system in parallel.

5. The method of claim 3, further comprising inputting the text of the reference document and the text of the patents into the ML model and the NLU system serially where the output of one is used as input to the other.

6. The method of claim 2, wherein inputting the text of at least a portion of the patents returned from the patent search to the AI system further comprises parsing each of the patents to extract a specification and to extract the claims therein, and passing the specification and the claims to the AI system with a corresponding patent identifier.

7. The method of claim 1, further comprising basing the claim construction rules and the patent infringement rules on statutes, codes, or case law that are selectable by a user.

8. A system, comprising:
    a hybrid artificial intelligence (AI) system in communication with a patent search provider and a client device over a network, the hybrid AI system to:
        receive a search request from the client device to find patents that read on a text description provided in a reference document;
        determine relevant portions of the reference document to narrow a focus of subsequent analysis by using preconditioning rules that: exclude figures and tables from the reference document, and through a user interface, enable a user to resolve meanings of any acronyms found in the reference document or enter annotations for the reference document to provide further definitions or to indicate text weighted higher by the user during searching;
        perform a patent search on the reference document to find a set of patents that are similar to the reference document
    and an AI system in communication with the hybrid AI system, the AI system to
        input text of the reference document to determine the meanings of words in the reference document;
        input text of at least a portion of the patents returned from the patent search to determine meanings of the claim elements based on the meanings of words in corresponding patent;
        for each of the patents, perform an element-by-element search to find matches between the claim elements and the relevant portions of the reference document based on the meanings of words; and
        output to the client device a list of the patents having claims elements that match the text of the relevant portions of the reference document along with element confidence scores or claim confidence scores.

9. The system of claim 8, wherein the AI system uses a machine learning (ML model), a natural language understanding (NLU) system, or both to perform the element-by-element search.

10. The system of claim 9, wherein the text of the reference document and the text of the patents are input into the ML model and the NLU system in parallel.

11. The system of claim 9, wherein the text of the reference document and the text of the patents are input into the ML model and the NLU system serially where the output of one is used as input to the other.

12. The system of claim 8, wherein the patents returned from the patent search are parsed to extract a specification and to extract the claims before being input to the AI system.

13. A non-transitory computer-readable medium containing program instructions for performing patent claims analysis, the program instructions for:

using preconditioning rules to determine relevant portions of a reference document, the preconditioning rules used to: exclude figures and tables from the reference document, and through a user interface, enable a user to resolve meanings of any acronyms found in the reference document or enter annotations for the reference document to provide further definitions or to indicate text weighted higher by the user during searching;

submitting a query to find a set of patents that are similar to the reference document;

receiving a set of matching patents from the query and using claim construction rules to determine how a meaning of claim elements of the patents will be ascertained;

using patent infringement rules and an artificial intelligence (AI) system to search the relevant portions of the reference document with the claim constructed claim elements of the patents returned from the search, wherein the claim construction rules and the patent infringement rules are based on legal statues of one or more countries; and ranking the set of patents based on assigned confidence scores indicating a degree to which respective claim elements match the relevant portions of the reference document, and presenting the results to a client device.

14. The non-transitory computer-readable medium of claim 13, wherein searching the relevant portions of the reference document with the claim constructed claim elements of the patents further comprises:

inputting text of the reference document into the AI system to determine the meanings of words in the reference document;

inputting text of at least a portion of the patents returned from the patent search to the AI system to determine meanings of the claim elements based on the meanings of words in the corresponding patent; and for each of the patents, performing, by the AI system, an element-by-element search to find matches between the claim elements and the relevant portions of the reference document based on the meanings of words.

15. The non-transitory computer-readable medium of claim 14, wherein performing the element-by-element search further comprises using, by the AI system, a machine learning (ML model), a natural language understanding (NLU) system, or both, to perform the element-by-element search.

16. The non-transitory computer-readable medium of claim 15, further comprising inputting the text of the reference document and the text of the patents into the ML model and the NLU system in parallel.

17. The non-transitory computer-readable medium of claim 15, further comprising inputting the text of the reference document and the text of the patents into the ML model and the NLU system serially where the output of one is used as input to the other.

18. The non-transitory computer-readable medium of claim 14, wherein inputting the text of at least a portion of the patents returned from the patent search to the AI system further comprises parsing each of the patents to extract a specification and to extract the claims therein, and passing the specification and the claims to the AI system with a corresponding patent identifier.

\* \* \* \* \*